United States Patent [19]
Minemoto et al.

[11] Patent Number: 6,008,927
[45] Date of Patent: Dec. 28, 1999

[54] OPTICAL FIBER MODULATOR HAVING AN OPTICAL FIBER HAVING A POLED PORTION SERVING AS AN ELECTROOPTIC ELEMENT AND METHOD FOR MAKING SAME

[75] Inventors: Hisashi Minemoto, Ootsu; Nobuki Itoh, Osaka; Daisuke Ishiko, Osaka; Satoshi Ishizuka, Osaka, all of Japan

[73] Assignee: Matsushita Electric Industrial Co., Ltd., Osaka, Japan

[21] Appl. No.: 09/049,099

[22] Filed: Mar. 27, 1998

[30] Foreign Application Priority Data

Mar. 27, 1997 [JP] Japan ................................. 9-075407
Mar. 20, 1998 [JP] Japan ................................. 10-072615

[51] Int. Cl.$^6$ ............................... G02F 1/03; G02F 1/035
[52] U.S. Cl. .......................... 359/245; 359/246; 385/2
[58] Field of Search ............................. 359/245, 246, 359/247, 248; 385/2, 3, 12

[56] References Cited

U.S. PATENT DOCUMENTS 5,699,461  12/1997  Minemoto et al. ....................... 385/12

FOREIGN PATENT DOCUMENTS

| 3-44562 | 2/1991 | Japan . |
| 5-297086 | 11/1993 | Japan . |
| 6-74979 | 3/1994 | Japan . |
| 8-219825 | 8/1996 | Japan . |

OTHER PUBLICATIONS

T. Fujiwara et al., "Large Electrooptic Modulation in a Thermally–Poled Germanosilicate Fiber", IEEE Photonics Technology Letters, vol. 7, No. 10, Oct. 1995, pp. 1177–1179.

Osamu Kamada et al., "Electro–Optical Effect of $Bi_4Ge_3O_{12}$ Crystals for Optical Voltage Sensors", Jpn. J. Appl. Phys., vol. 32 (1993) pt. 1, No. 9B, pp. 4288–4291.

"Optical Fiber Sensors" w/Spot translation, edited by Takayoshi Ohkoshi (1986), pp. 148–153.

A.C. Liu et al., "Electro–optic phase modulation in a silica channel waveguide", Optics Letters, vol. 19, No. 7, Apr. 1994, pp. 466–468.

*Primary Examiner*—Georgia Epps
*Assistant Examiner*—Suzanne Letendre
*Attorney, Agent, or Firm*—McDermott, Will & Emery

[57] ABSTRACT

An optical fiber modulator comprises an optical fiber, a substrate having a groove pattern in which the optical fiber is fixed, and a modulation unit including a polarizer, an electrooptic element, and an analyzer aligned in a light path of the optical fiber in this order, wherein the electrooptic element is made of a poled portion of the optical fiber, and when the electrooptic element is in an electric field-free condition, an absolute value, δ, of a phase difference of a beam passed through the electrooptic element is within the following range $$(m/2-1/6)\pi \leq \delta \leq (m/2+1/6)\pi$$

wherein m is an odd number. When the portion of the optical fiber is poled from two different directions, the modulation unit should further include a wave plate, and an absolute value, δ1, of a phase difference of a beam passed through the wave plate and the electrooptic element is within the following range of $(n/2-1/6)\pi \leq \delta \leq (n/2+1/6)\pi$ wherein n is an odd number. Methods for making the modulators are also described.

22 Claims, 8 Drawing Sheets

OPTICAL FIBER MODULATOR HAVING AN OPTICAL FIBER HAVING A POLED PORTION SERVING AS AN ELECTROOPTIC ELEMENT AND METHOD FOR MAKING SAME

BACKGROUND OF THE INVENTION

1. Field of The Invention

This invention relates to an optical fiber modulator wherein an optical fiber has a poled portion serving as an electrooptic element and having a second-order nonlinear optical effect, and also to a method for making the fiber modulator. The optical fiber modulator of the invention may be applicable to not only as a sensor, but also as an optical switching device and an optical fiber modulator for communication systems.

2. Description of the Prior Art

Known electrooptic elements used in optical fiber sensors for measuring a voltage or in optical fiber modulators are made, for example, of optical crystals of $LiNbO_3$ (hereinafter referred to simply as LN), $Bi_{12}SiO_{20}$ (hereinafter abbreviated to BSO), $Bi_{12}GeO_{20}$ (hereinafter abbreviated to BGO), and the like. According to "Optical Fiber Sensors" (published by Ohm Co., Ltd. and edited by Takayosi Ohkoshi (1986), pp. 149 to 153), optical fiber voltage sensors have high insulating properties, and have been developed especially for the measurement of high voltage.

In recent years, in order to reduce the number of optical elements used in optical fiber sensors, studies have been made on optical fiber sensors of the type wherein lenses and mirrors are omitted from the sensor, and instead, an magnetooptic element or an electrooptic element is assembled in the light path of an optical fiber. This type of sensor is described, for example, in Japanese Laid-open Patent Application Nos. 5-297086, 6-74979, and 8-219825. Quite recently, it has been found that when an optical fiber block is poled, a second-order nonlinear optical effect develops. Using the poled block, optical modulation devices have now been made as described, for example, by A. C. Liu et al in Opt. Lett. Vol. 19, pp. 466–468 (1994), by T. Fujiwara et al in IEEE Photonics Lett. Vol. 7, pp. 1177 to 1179 (1995), and in Japanese Laid-open Patent Application No. 9-230293.

However, with optical fiber sensors or modulators using LN, which is representative of second-order nonlinear optical material, it is necessary that an input beam be controlled so as to make an angle of axial deviation at around 0.1 to 0.2 or below as described in Japanese Laid-open Patent Application No. 3-44562 and "Optical Fiber Sensors" (published by Ohm Co., Ltd. and edited by Takayosi Ohkoshi (1986), page 153).

Figure 8A:
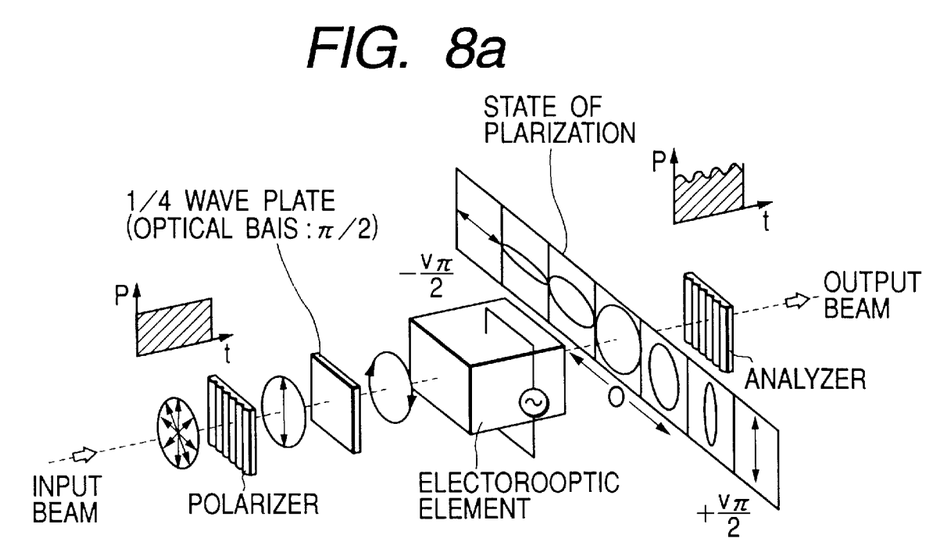
FIGS. 8a and 8b are, respectively, a schematic view showing an arrangement of a conventional optical fiber sensor and a graph showing a working principle of the fiber sensor.

Problems involved in these sensors are described with reference to FIGS. 8a and 8b. FIG. 8a schematically shows a working principle of a typical optical fiber voltage (or electric field) sensor. In FIG. 8a, a randomly polarized input beam transmitted from an optical fiber is passed to a polarizer wherein a linearly polarized beam component alone is transmitted. The beam transmitted through a $\lambda/4$ plate is converted to a circularly polarized beam because the phase difference of the beam relative to the respective principal dielectric axes occurs by $\pi/2$. Further, when passed through an electrooptic element, the beam undergoes a phase difference corresponding to a voltage applied to the element, and is changed in various forms including from circularly polarized beam to linearly polarized beam. This is particularly shown in FIG. 8a as the state of polarized output beam. After transmission through an analyzer, the change in the polarized state is observed as a change in beam intensity. In FIG. 8a, P and t of shaded sketches, respectively, indicate a beam intensity and a time, and the sketches show that a beam with given powder is inputted, and a modulated beam is outputted at the positions depicted, respectively.

Figure 8B:
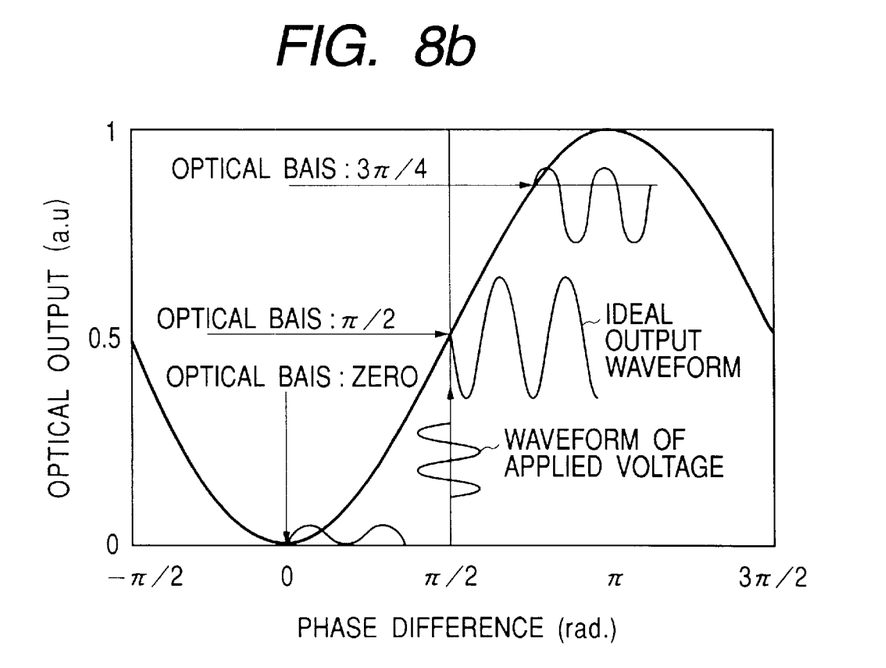

FIG. 8b is a graph showing the relation between the beam output strength and the phase difference or optical bias of a fiber sensor. The quantity of transmission of output light or beam is determined by the phase difference of the beam based on an electrooptic effect and an optical bias (determined by a $\lambda/4$ plate). The output beam intensity is expressed by SIN function. When the optical bias is given by $\pi/2$ or by a multiple of an odd number of $\pi/2$, a portion of the SIN function, which exhibits good linearity, can be used. On the other hand, when the optical bias is deviated from $\pi/2$, e.g. when the optical bias is at $3\pi/4$, the output waveform is distorted. In addition, when the optical bias is considerably deviated (e.g. when the optical bias is at zero), not only the output waveform is considerably distorted, but also a degree of modulation becomes very low as is particularly shown in FIG. 8b. With LN, when a beam is passed from its crystal axis (z axis), any birefringence phenomenon does not appear. Only a phase difference of $\pi/2$ caused by the $\lambda/4$ plate appears, so that modulation signals, which are free of any distortion, can be obtained as designed. However, when an input beam is deviated from the z axis, a great phase difference appears owing to the great spontaneous or natural birefringence of LN, thereby causing the optical bias to be deviated from an original one. As a result, there arise the problems that the waveform distorts, and the degree of modulation suffers a great temperature change due to the great change of spontaneous birefringence depending on the temperature.

In order to solve these problems, it may occur to use crystals which are free of spontaneous birefringence. Known spontaneous birefringence-free, nonlinear optical materials or crystals include, for example, BGO, BSO, $Bi_4Ge_3O_{12}$ and the like. However, both BGO and BSO, respectively, have the optical rotary power (i.e. the effect of the plane of polarization being rotated in proportion of the crystal length), so that the crystal length cannot be large, with the attendant problem that the degree of modulation of a beam cannot be optionally set and the degree of modulation cannot be sufficiently increased as described, for example, in the above-mentioned "Optical Fiber Sensors", edited by T. Ohkoshi, pp. 152 to 153. On the other hand, $Bi_4Ge_3O_{12}$ undesirably involves a DC drift at high temperatures, thus presenting the problem that when used as an optical modulator, a stable temperature characteristic is not ensured. This is particularly reported, for example, by O. Kamada (Jp. J. Appl. Phys. Vol. 32 (1993), pp. 4288 to 4291).

In an optical fiber sensor of type wherein an ordinary electrooptic element is set in position in an optical fiber, any lens is not used. Accordingly, it is necessary to suppress an adverse influence caused by the divergence of a beam, disenabling one to take a sufficiently large crystal length. Accordingly, in case where LN, which has a relatively large electrooptic constant, is used as an electrooptic element, there arises the problem that sensitivity is not enough for use as an optical fiber sensor. Alternatively, if liquid crystals are used, problems are involved in that the response speed becomes very low, an abrupt change of voltage cannot be measured accurately, and such liquid crystals may be solidified when used at low temperatures.

Where part of an optical fiber is poled and used as an electrooptic element, there arises a problem as experienced in the case of a sensor wherein an LN crystal is used as an electrooptic element and an incident beam is deviated from an optical axis (z axis). More particularly, if an optical fiber is poled at part thereof for use as an electrooptic element, not only a nonlinear optical effect (electrooptic effect), but also the anisotropy of refractive index (spontaneous birefringence) develops. When such a poled fiber is used in an optical fiber sensor, it is difficult to obtain an intended fiber sensor. This difficulty does not occur in known optical modulators wherein a change in refractive index based on the electrooptic effect of one of principal dielectric axes is utilized, and in fact, has not been recognized at all up to now.

In an optical modulator proposed, for example, in Japanese Laid-open Patent Application No. 9-230293, the electrooptic effect alone is taken into account, and no mention is made of any optical device as to how to deal with spontaneous birefringence. Accordingly, the resultant modulator has poor linearity. In this instance, two holes are made in the clad portion of an optical fiber so as to insert electrodes thereinto. As a result, there is developed spontaneous birefringence which is ascribed to the anisotropy of the sectional structure of the optical fiber and which is much greater than the spontaneous birefringence developed according to the poling treatment. This optical fiber has such a function as a so-called "polarization-preserving fiber", and the polarized state of a beam inputted from portions other than principal dielectric axes (i.e. a line connecting a pair of holes and a direction normal to the line) becomes very unstable. If such an optical fiber is under varying temperature conditions or is applied with an external pressure thereon, the state of polarization of the beam changes considerably. When this optical fiber is used as an electrooptic element and a beam, which has the direction of poling different from the principal dielectric axes, is inputted to the fiber, the degree of modulation greatly changes by changing a temperature, for example, only by several degrees in centigrade. Thus, the electrooptic element has a very poor temperature characteristic and a large distortion rate.

SUMMARY OF THE INVENTION

It is accordingly an object of the invention to provide an optical fiber modulator which comprises an optical fiber having a poled portion whereby the portion serves as an electrooptic element having an electrooptic effect and a function as a $\lambda/4$ plate.

It is another object of the invention to provide an optical fiber modulator which comprises an optical fiber having a portion which is so poled that an absolute value, $\delta$, of a phase difference relative to a transmitted beam at the time when no electric field or voltage is applied to the poled portion is at a multiple of an odd number of $\pi/2$ whereby the optical fiber modulator has good linearity.

It is a further object of the invention to provide an optical fiber modulator which comprises an optical fiber having a portion which is so poled that an absolute value of a phase difference, relative to a transmitted beam at the time when no electric field or voltage is applied to the poled portion, is substantially zero whereby the optical fiber modulator has a good temperature characteristic and good linearity without deviation of the optical bias at different temperatures.

It is a still further object of the invention to provide an optical modulator which has little or no problem on DC drift as is experienced in the case of sensors using an isotropic crystal such as $Bi_4Ge_3O_{12}$.

It is another object of the invention to provide an optical fiber modulator which comprises an optical fiber having an elongated, poled portion serving as an electrooptic element whereby the optical fiber sensor is of a integrated, lensfree type having great sensitivity.

It is still another object of the invention to provide an optical fiber modulator which comprises a U-shaped optical fiber having a flat bottom thereof and having a poled portion at the flat bottom whereby the directions of beam input and output become parallel to each other, and the modulator has wide utility, as a sensor, in various fields.

It is another object of the invention to provide methods for making such optical fiber modulators and sensors as mentioned above.

The above objects can be achieved, according to one embodiment of the invention, by an optical fiber modulator which comprises an optical fiber, a substrate having a groove pattern in which the optical fiber is fixed, and a modulation unit including a polarizer, an electrooptic element, and an analyzer aligned in a light path of the optical fiber in this order, wherein the electrooptic element is made of a poled portion of the optical fiber, and when an electric field is not applied to the electrooptic element, i.e. when the electrooptic element is in an electric field-free condition, an absolute value, $\delta$, of a phase difference of a beam passed through the electrooptic element is within the following range $$(m/2 - 1/6)\pi \leq \delta \leq (m/2 + 1/6)\pi$$

wherein m is an odd number.

Preferably, $\delta$ is such that $\pi/3 \leq \delta \leq 2\pi/3$.

Preferably, the poled portion is formed by properly poling from only one direction normal to the light path. It will be noted that the above-defined absolute value may be obtained when a portion of an optical fiber is successively poled from two different directions vertical to the light path under controlled poling conditions although the poling conditions are more complicated than those for the poling from one direction.

According to another embodiment of the invention, there is also provided an optical fiber modulator which comprises an optical fiber, a substrate having a groove pattern in which the optical fiber is fixed, and a modulation unit including a polarizer, an electrooptic element, and an analyzer aligned in a light path of the optical fiber in this order provided that a wave plate is provided between the polarizer and the electrooptic element or between the electrooptic element and the analyzer, wherein the electrooptic element is made of a poled portion of the optical fiber, and when the electrooptic element is in an electric field-free condition, an absolute value, $\delta 1$, of a phase difference of a beam passed through the wave plate and the electrooptic element is within the following range $$(n/2 - 1/6)\pi \leq \delta \leq (n/2 + 1/6)\pi$$

wherein n is an odd number. Preferably, $\delta 1$ is such that $$\pi/3 \leq \delta 1 \leq 2\pi/3$$

The poled portion serving as the electrooptic element in this embodiment is obtained by successively poling from two different directions. The two different directions should preferably be substantially normal to each other within a range of 90 degrees±10 degrees.

In both embodiments, the optical fiber may be straight, or may be shaped in U form having a flat bottom. In the latter case, the modulation unit is arranged at the flat bottom.

According to a further embodiment of the invention, there is provided a method for making an optical fiber modulator which comprises an optical fiber, a substrate having a groove pattern in which the optical fiber is fixed, and a modulation unit including a polarizer, an electrooptic element, and an analyzer aligned in a light path of the optical fiber in this order, wherein the electrooptic element is made of a portion of the optical fiber, which is poled while observing a state of a polarized passed through the poled portion so that when the poled portion is in an electric field-free condition, an absolute value, δ, of a phase difference of a beam passed through the poled portion is within the following range $$(m/2-\frac{1}{6})\pi \leq \delta \leq (m/2+\frac{1}{6})\pi$$

wherein m is an odd number.

In this case, the absolute value, δ, is preferably such that $\pi/3 \leq \delta \leq \frac{2}{3}\pi$ wherein m is an odd number.

Moreover, in order to ensure the above-defined absolute value, the portion of the optical fiber may be poled in such a way that when the electrooptic element assembled in the modulator is applied with an AC electric field, a distortion rate of the modulation signals of a beam immediately after passage through the analyzer of the modulation unit is substantially in a minimum. In this method, the portion of the optical fiber is preferably poled from only one direction substantially vertical to the light path within a range of 90°±10°.

According to still another embodiment of the invention, there is provided a method for making an optical fiber modulator which comprises an optical fiber, a substrate having a groove pattern in which the optical fiber is fixed, and a modulation unit including a polarizer, an electrooptic element, and an analyzer aligned in a light path of the optical fiber in this order provided that an wave plate is provided between the polarizer and the electrooptic element or between the electrooptic element and the analyzer, wherein the electrooptic element is made of a portion of the optical fiber, which is successively poled from two different directions substantially vertical to the light path within a range of 90±10 degrees while observing a state of polarization of a beam passed through both a wave plate having the same optical phase difference as the first-mentioned wave plate and the poled portion for each application of the electric field or voltage so that when the poled portion is in an electric field-free condition, an absolute value, δ1, of a phase difference of a beam passed through the poled portion is within the following range $$(n/2-\frac{1}{6})\pi \leq \delta1 \leq (n/2+\frac{1}{6})\pi$$

wherein n is an odd number.

More preferably, δ1 is such that $\pi/3 \leq \delta1 \leq 2\pi/3$.

In this embodiment, the poling may be effected such that when the electrooptic element assembled in the modulator is applied with an AC electric field, a distortion rate of the modulation signals of the beam immediately after passage through the analyzer in the modulation unit is substantially in a minimum.

In both methods, the optical fiber may be straight, or may be shaped in U form having a flat bottom. In the latter case, the modulator is effectively used as an optical fiber voltage or electric field sensor.

PREFERRED EMBODIMENTS OF THE INVENTION

When poled, glass or optical fibers develop not only a nonlinear optical effect (or electrooptic effect), but also anisotropy of refractive index.

Figure 7A:
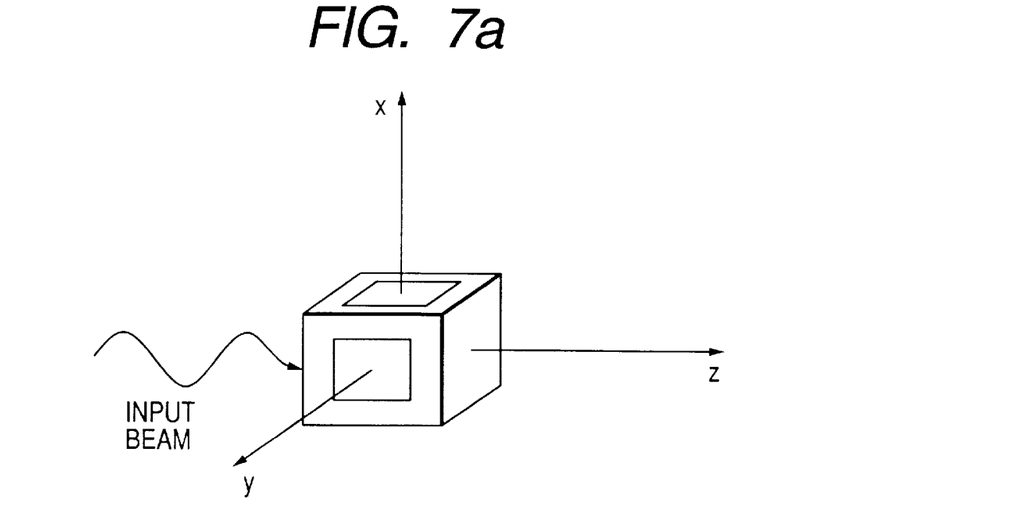
FIGS. 7a and 7b are, respectively, schematic views illustrating a working principle of an electrooptic element according to the invention.
Figure 7B:
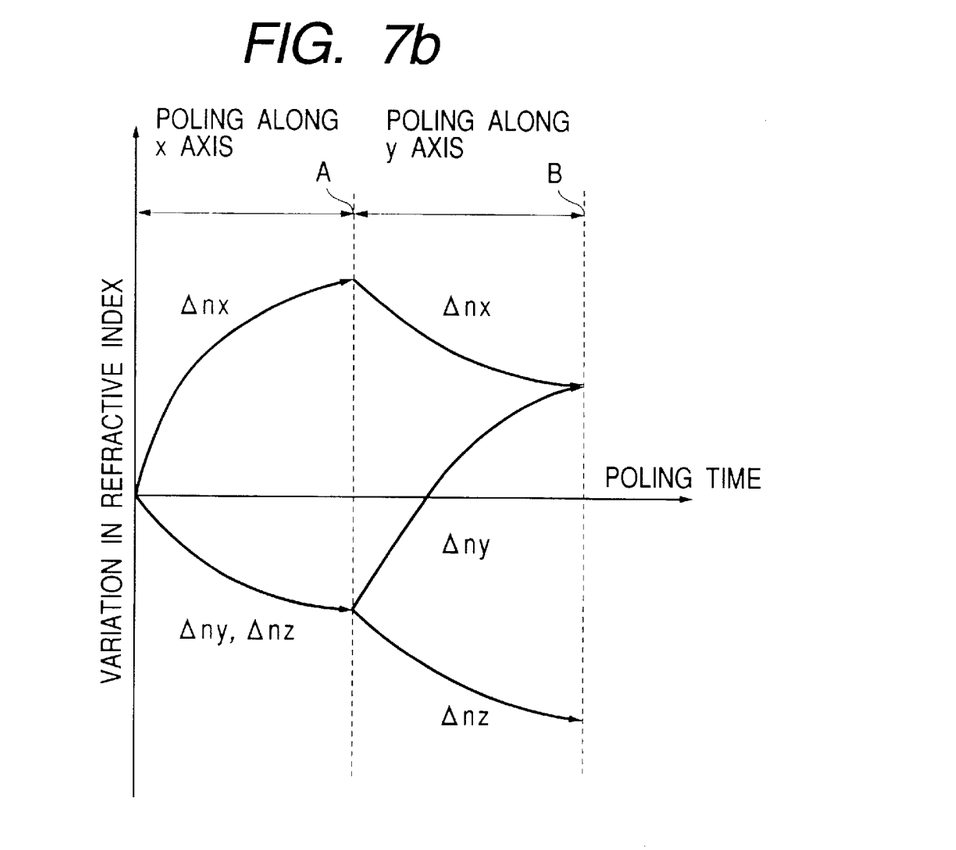

Reference is now made to the accompanying drawings, and particularly to FIGS. 7a and 7b wherein there is shown a working principle of an electrooptic element usable in an optical fiber modulator according to the invention if the electrooptic element is constituted as part of an optical fiber.

In FIG. 7a, there is shown an electrooptic element B in the form of a cubic block of a nonlinear optical material which is made, for example, of glass or an optical fiber capable of poling. The block is attached with electrodes along axes of x and y as shown. In FIG. 7a, although the x and y axes are shown to be intersected at right angles to each other, the intersection at right angles is not always necessary. In this connection, however, where the x and y axes are intersected at angles within a range of 90±10 degrees, the poling along the y axis is unlikely to be influenced by the results of an initial poling treatment along the x axis, ensuring easy control of the poling treatment along the y axis. The z axis is intersected substantially at right angles relative to the x and y axes, respectively.

In the practice of the invention, since an optical fiber is poled at part thereof to provide an electrooptic element in the optical fiber, the direction of propagation of a beam, i.e. an axial direction of the optical fiber, is determined as a z axis.

For the poling, the cubic block is heated, for example, to a temperature of 150 to 300° C., followed by application of an electric field ranging from $1\times10^4$ to $1\times10^6$ V/cm. When the poling treatment is carried out along the x axis, electronic polarization along the x axis becomes great. As a result, a refractive index, nx, relative to a beam polarized along the x axis (i.e. a beam whose electric field oscillates in the direction of the x axis) increases as is particularly shown in FIG. 7b.

During the course of the poling treatment, the poled block is assembled in an optical system, as shown in FIG. 8a, without use of any λ/4 plate, and the plane of polarization of an input beam (i.e. a linearly polarized beam) is set at an angle of 45° as viewed from the x axis toward the y axis, thereby observing a state of polarized beam. When the beam passes through the electrooptic element consists of a circularly polarized beam as depicted at the center of the state of polarized beam in FIG. 8a, the poling treatment is completed. The term "circularly polarized beam" used herein means that a phase difference of the beam transmitted through the principal dielectric axes of the x and y axes is $\pi/2$ or a multiple of an odd number of $\pi/2$. The electrooptic element made in this manner is one which has an electrooptic effect and the function as an element serving as a wave plate capable of imparting an optical bias to the system. Accordingly, when using the electrooptic element, the resultant optical fiber modulator exhibits good linearity without use of any $\lambda/4$ plate. The degree of the optical bias should preferably be $\pi/2$, which is an ideal value, or a multiple of an odd number thereof. In this connection, however, if it is unnecessary to avoid a distortion of an output waveform, the absolute value, $\delta$, of the phase difference may be deviated from the ideal value within a range of about $\pm\pi/6$. In this range, a degree of modulation is not deviated from a predetermined, designed value, and such a modulator is usable. Thus, where a block of an optical fiber is poled for use as an electrooptic element in such a way that the phase difference of a beam transmitted through the poled portion in an electric field-free condition is expressed according to the following inequality wherein $\delta$ is an absolute value of the phase difference, an optical fiber modulator with good properties can be fabricated without use of any wave plate $$(m/2-\frac{1}{6})\pi \leq \delta \leq (m/2+\frac{1}{6})\pi$$

wherein m is an odd number.

If the phase difference is great, the degree of modulation suffers a great temperature change due to the great change of spontaneous birefringence depending on the temperature, so that a smaller value of m leads to a more stable optical fiber modulator. Accordingly, it is preferred to use the electrooptic element made of an optical fiber block poled in such a way that the absolute value, $\delta$, of the phase difference is given according to the following inequality $$\pi/3 \leq \delta \leq \frac{2}{3}\pi$$

The modulator using such an element as mentioned above exhibits a more stable temperature characteristic.

Instead of the observation of the polarized state of the output beam, the poling treatment can be completed such that when an AC voltage is applied to the electrooptic element, a distortion rate of the resultant beam output is substantially minimized. The minimization of the distortion rate can be simply confirmed through a spectrum analyzer. This observation enables one to make an electrooptic element which satisfies the above-defined inequalities with respect to the absolute value, $\delta$.

Next, when the portion of an optical fiber poled along the x axis is further poled along the y axis by application of an electric field in the same manner as described above. This poling allows a refractive index, ny, relative to a beam having a beam component polarized along the direction of the y axis to increase as shown in FIG. 8b. In order to confirm the poling along the y axis so that nx≈ny, the block of the optical fiber poled in both directions along the x and y axes is set in position in the optical system of FIG. 8a, wherein a wave plate is set in position, to observe a poled state of the block serving as an electrooptic element. While properly choosing a poling time and a poling voltage, the poling treatment is continued until the beam transmitted through the electrooptic element is polarized to provide a circularly polarized beam. The absolute value, $\delta 1$, of the total phase difference generated in the wave plate and the electrooptic element is a multiple of an odd number of $\pi/2$. It will be noted that the absolute value, $\delta$, of the phase difference generated by the electrooptic element alone is a multiple of an even number of $\pi/2$.

Accordingly, where an optical fiber is poled to provide an electrooptic element, the poling should be effected such that the absolute value, $\delta 1$, of the phase difference of a beam transmitted through a wave plate and the electrooptic element is expressed by the following inequality whereby a substantially optically isotropic electrooptic element can be obtained $$(n/2-\frac{1}{6})\pi \leq \delta 1 \leq (n/2+\frac{1}{6})\pi$$

wherein n is an odd number.

If the phase difference is great, the degree of modulation suffers a great temperature change due to the great change of spontaneous birefringence depending on the temperature, so that a smaller value of n leads to a more stable optical fiber modulator. Accordingly, it is preferred that the absolute value, $\delta 1$, of the phase difference transmitted through the wave plate and the electrooptic element is given by the following inequality $$\pi/3 \leq \delta 1 \leq \frac{2}{3}\pi$$

Because of the ease in designing, a $\lambda/4$ plate is used as a wave plate. However, it is not principally necessary that the wave plate consist of $\lambda/4$ plate. More particularly, so far as the absolute value, $\delta 1$, of the phase difference transmitted through both the wave plate and the electrooptic element satisfies the above inequalities, the resultant modulator serves satisfactorily as an optical fiber modulator. In this connection, however, when the wave plate consists of a $\lambda/4$ plate and $\delta 1 \approx \pi/2$, the electrooptic element is in a condition where little spontaneous birefringence appears along the direction of beam transmission. In this condition, when nx≈ny, it is possible that the birefringence generated in the electrooptic element becomes substantially zero relative to the beam propagating along the z axis (i.e. a beam having a direction of polarization along the x or y axis, or along a direction between the x and y axes). When the poling treatment is performed along both directions of the x and y axes, nz becomes small as is shown in FIG. 7b. If optically isotropic glass is poled, a change in refractive index is usually at a level of 0.001 or below. On the other hand, the quantity of birefringence of LN (i.e. a difference between the maximal and minimal refractive indices) is about 0.09, which is greater by two orders of magnitude than that of the nonlinear optical material, i.e. the poled block of an optical fiber. This means that the accuracy in angle of a beam incident to the nonlinear optical material becomes greater by about two orders of magnitude than the accuracy of LN. This permits much easier fabrication of the electrooptic element. Moreover, since the electrooptic element is isotropic with respect to the beam propagating along the z axis, the temperature change of birefringence becomes smaller than in the case where nx is not equal to ny. More particularly, in case where a refractive index changes depending on the change of temperature, the relation of nx≈ny is maintained. Accordingly, the optical bias of the electrooptic element becomes so small that there can be made an optical fiber modulator including a voltage (electric field) sensor having a very good temperature characteristic. As a matter of course, the optical fiber modulator can be used not only as the sensor, but also as a switching device or a modulation device for communication systems, which has a good temperature characteristic and a low distortion.

Instead of observing the poled state of the output beam for the completion of the poling treatment, an AC voltage may be applied to the electrooptic element so that the poling is completed at the time when the distortion rate of a beam output is in a minimum. In this case, an optical fiber modulator can be fabricated in which the phase difference of a beam transmitted through the wave plate and the electrooptic element is within a range of $(n/2-\frac{1}{6})\pi \leq \delta 1 \leq (n/2+\frac{1}{6})\pi$, preferably $\pi/3 \leq \delta 1 \leq \frac{2}{3}\pi$, in terms of an absolute value thereof.

Where an optical fiber is used at a part thereof as the electrooptic element, the electrooptic element can be elongated, as desired, without use of any lens. Accordingly, an optical fiber modulator having a great degree of modulation can be realized.

Especially, when an optical fiber is shaped in U form having a flat bottom, the beam input can be directed in the same way as the beam output, enabling one to make particularly a small-sized optical fiber sensor.

Using the block of a nonlinear optical material, the fundamental principle of how a poled block works as an electrooptic element is described above. In the practice of the invention, a part or portion of an optical fiber, not a block thereof, is poled as it is, and is assembled in optical fiber modulators as an electrooptic element.

Reference is now made to FIGS. 1 and 2a to 2c which illustrate an optical fiber modulator according to one embodiment of the invention and a method for making such a modulator.

First, how to pole an optical fiber is illustrated with reference to FIGS. 2a to 2c.

Figure 2A:
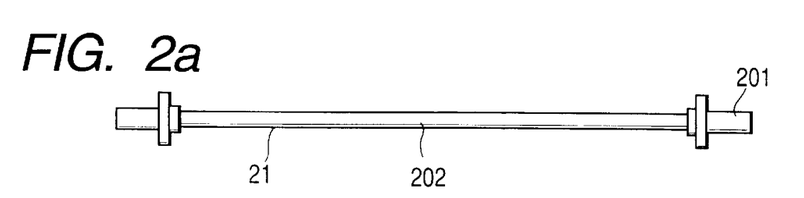
FIGS. 2a to 2d are, respectively, schematic views illustrating a procedure of poling an optical fiber according to the invention.

Initially, an optical fiber 21 having a ferrule 201 at opposite ends thereof is provided as shown in FIG. 2a. The optical fiber used in the present invention may be any types of optical fibers capable of being poled. Such an optical fiber usually comprises silica. Preferably, the optical fiber is made of a glass composition comprising silica, and Ge and/or lead, and is known as germanosilicate or lead silicate optical fibers. If present, Ge and/or lead may be present in the optical fiber in an amount of from 5 to 20 wt %, based on the total composition, in the form of oxides or fluorides. Other additive oxides or fluorides of metals such as Te, Bi, Sn and the like may also be present in the glass composition in total amounts of up 40 wt % based on the composition.

The optical fiber 21 may be either a single mode optical fiber or a multi mode optical fiber. When using a LED beam source, a multi mode optical fiber is preferred because a greater quantity of beam is taken in through the fiber. The optical fiber has such a structure which includes a core of the above-mentioned glass composition having a diameter, for example, of 200 μm and a cladding layer having a thickness, for example, of 250 μm, covered with a jacket 202. The core portion may be doped, for example, with $GeO_2$ so as to enhance its refractive index as is known in the art.

Figure 2B:
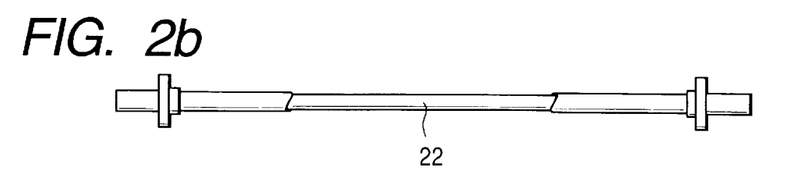

In a next step shown in FIG. 2b, the jacket 202 of the optical fiber 21 at a portion thereof is remove to provide a jacket-free, bare portion 22. The bare portion 22 consists of the core and the cladding layer but is free of any jacket and a buffering layer although a surface treating agent may be deposited on the cladding layer as used to permit intimate contact between the cladding layer and the buffer layer.

Figure 2C:
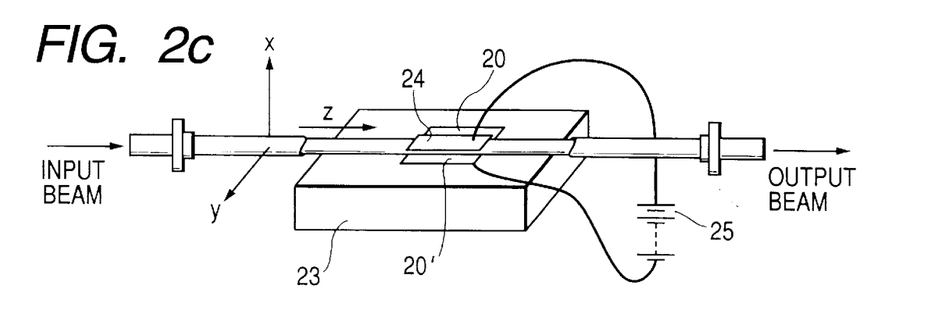

As shown in FIG. 2c, the bare portion 22 is fixed in a groove of a heater 23 so that a portion to be poled is sandwiched between a pair of electrodes 20, 20'. In FIG. 2c, the portion 22 is set so that it is poled along an x axis as shown, and the y axis indicated in the figure is a direction determined to be substantially normal to the x axis within a range of 90±10 degrees and the z axis is determined as a direction along which a beam propagates. The z axis is substantially normal to the x or y axis within a range of 90±10 degrees.

In this condition, the optical fiber is maintained straight, through which substantially collimate light is passed as an input beam to confirm that the state of a polarized beam during the course of propagation through the optical fiber is in order.

The portion 24 to be poled is heated to a temperature ranging from 150 to 350° C. by means of the heater 23, followed by application of a voltage, for example, of 5 kV from an electric supply 25. when a space between the electrodes is 5 mm, for a time of 30 to 100 minutes. In this way, the poling treatment along the x axis is performed.

The application of the voltage is stopped to confirm that the portion is poled to a satisfactory extent while observing the state of polarization of a beam. More particularly, the poling treatment is repeated until a phase difference of the beam transmitted through the poled portion in a condition where no voltage is applied thereto is within a range of $(m/2\pm\frac{1}{6})\pi$. It will be noted that the portion 24 to be poled has a length corresponding to an electrode length, and can be arbitrarily changed in length by changing the electrode length. In general, the length of a poled portion is within a range of 0.3 to 5 cm depending on the purpose. The poling along the x axis is described above. The direction may be along the y axis, which is also substantially vertical to the light path or the z axis.

Figure 1:
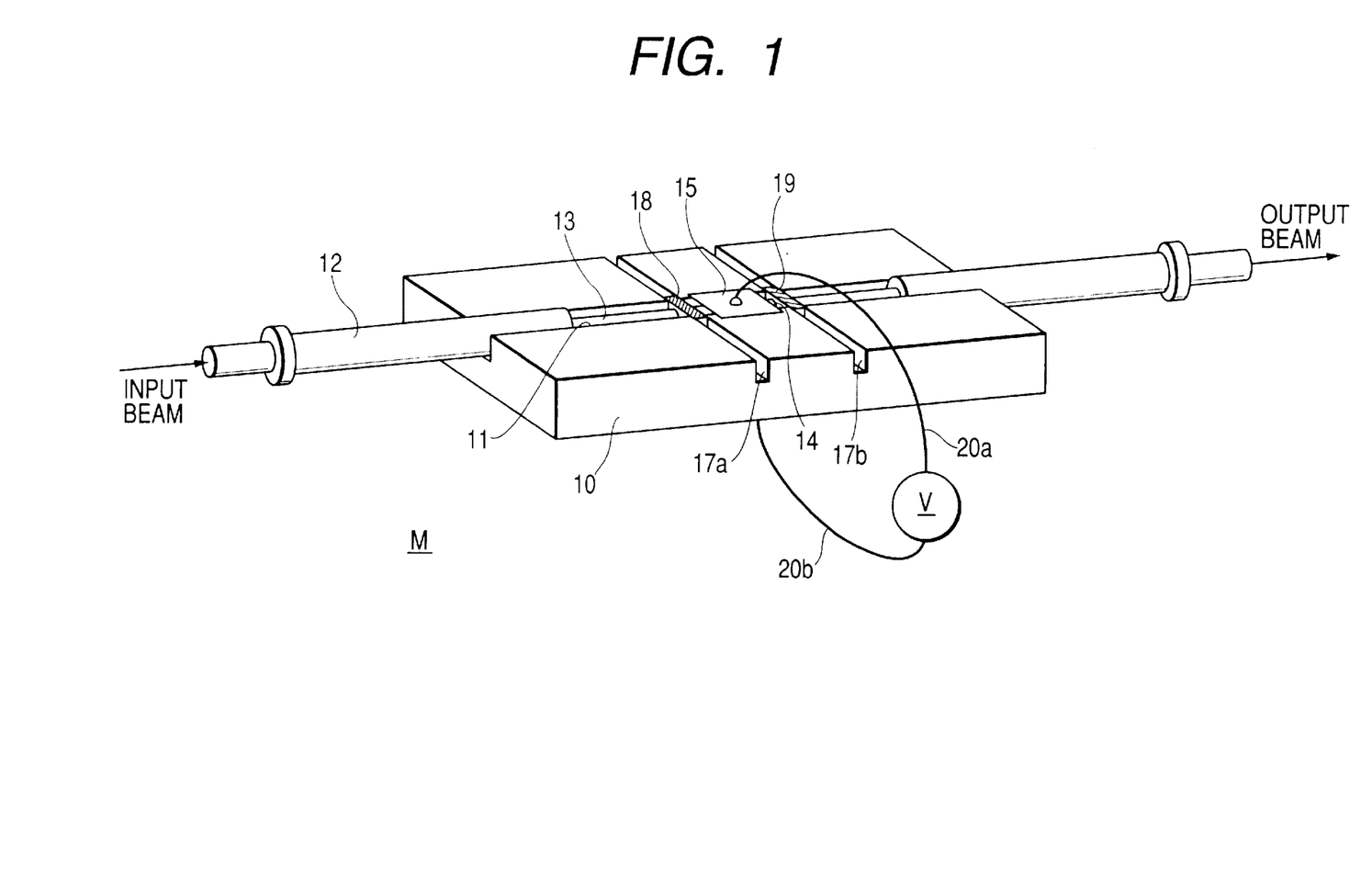
FIG. 1 is a schematic view illustrating an optical fiber modulator according to one embodiment of the invention.

The optical fiber having the poled portion as described above is used to make a linear optical fiber modulator shown in FIG. 1.

In FIG. 1, there is shown an optical fiber modulator M including a substrate 10 having a straight groove 11 and an optical fiber 12 having a bare fiber portion 13 and a poled portion 14 attached with an electrode 15 at opposite sides of the portion 14. The poled portion 14 serves as an electrooptic element. The substrate 10 has two further grooves 17a, 17b made normal to the first-mentioned straight groove 11. A polarizer 18 is set in the groove 17a, and an analyzer 19 is set in the groove 17b so that the polarizer 18, the electrooptic element 14 and the analyzer 19 are aligned in a light path of the optical fiber 12. A power supply V has leads 20a, 20b, and the lead 20a is electrically connected to the upper electrode 15. The lead 20b is electrically connected to the other electrode 15 (not shown) attached to a corresponding portion of the substrate 10 which has been made thin to about 0.1 mm.

The substrate 10 may be made of insulating materials such as glass, ceramics, resins and the like. In view of good processability and insulating properties, a glass-epoxy resin substrate is preferred. For the fabrication of the modulator M, the substrate 10 is first provided, and the groove 11 is formed in the substrate 10 by means of a rotary blade saw. The optical fiber 12 is fixed to the groove 11 by means of a ceramic or epoxy resin bonding agent.

After the fixing, the grooves 17a, 17b are made in the substrate 10 at opposite ends of the poled portion 14 by means of a rotary blade saw so that the bare portion 13 of the optical fiber 12 is also cut away. The optical elements 18, 19 are set in the light path of the optical fiber 12. In practice, the polarizer 18 and the analyzer 19 are, respectively, bonded to and fixed in the grooves 17a, 17b by a usual manner.

Finally, the electrodes 15 are disposed on opposite sides of the poled portion 14 provided that one of the electrodes 15 is bonded to a portion at a lower side of the substrate 10 which has been made thin beforehand.

In operation, a beam from LED is passed as an input beam from one end of the optical fiber 12 as shown, and an AC voltage of 1000 V is applied to the electrooptic element 14 via the leads 20a, 20b connected to the respective electrodes 15 to determine a degree of modulation of an output beam, revealing that a degree of modulation is 1.8% with a distortion rate of 1%. The distortion rate is degraded when the absolute value, $\delta$, of the phase difference of the beam transmitted through the electrooptic element deviates from $m \times \pi/2$, but within a range of $\pm\pi/6$ relative to a preset value, the lowering of a modulation signal is not appreciable. Thus, the electrooptic element is usable in the optical fiber modulator. When the modulator having a degree of modulation of 1.8% is further subjected to measurement of a temperature characteristic within a range of −20 to +80° C., the variation is within ±5% relative to a degree of modulation at room temperature taken at 100%. The poled portion in this instance serves both wave plate and electrooptic element, any wave plate is unnecessary. Moreover, when the modulator M is placed at high temperatures of 70° C. or above, no DC drift is observed, unlike an optical modulator comprising a crystal plate of $Bi_4Ge_3O_{12}$, thereby ensuring a stable temperature characteristic.

In the foregoing, the poling treatment is performed by heating an optical fiber and applying a high voltage to the heated fiber. The poling may likewise proceed when a high electric field is applied to an optical fiber while exposing to UV light. Alternatively, there may be used other methods including a corona poling method, or a method of poling under high vacuum and high temperature conditions.

An optical fiber modulator and its fabrication according to further embodiments are described with reference to FIGS. 2c and 2d and FIG. 3 wherein a wave plate is used in combination with an electrooptic element.

In the same manner as the embodiment illustrated with reference to FIGS. 1 and 2a to 2c, an optical fiber is maintained straight, and it is confirmed that the state of polarization of a beam being propagating through the fiber is in order. The direction of initial poling is taken as x axis, and a direction substantially normal to the x axis within a range of 90 degrees±10 degrees is taken as y axis. The direction of a beam being propagated is taken as z axis shown in FIG. 2c. The portion 24 to be poled of the optical fiber 21 is heated to 300° by means of the heater 23 and poled by applying a voltage of 5 kV (at an electrode space of 0.5 mm) for 100 minutes to pole the portion 24 along the x axis as shown in FIG. 2c.

Figure 2D:
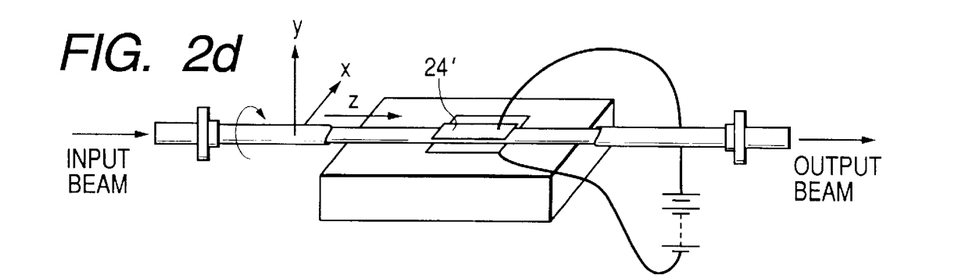
Figure 3:
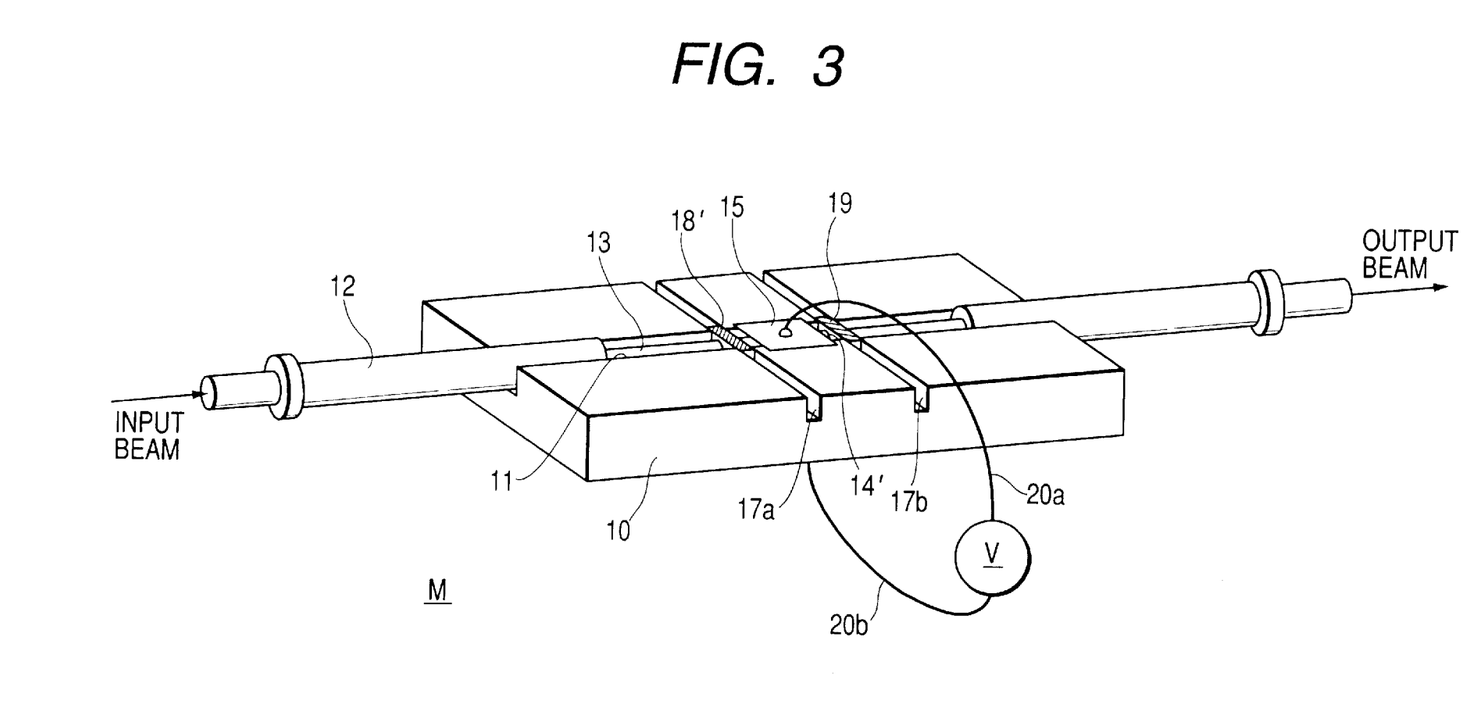
FIG. 3 is a schematic view illustrating an optical fiber modulator according to another embodiment of the invention.

Thereafter, the optical fiber is turned about the z axis within a range of 90 degrees±10 degrees, followed by poling at 300° C. for 30 minutes by application of a voltage of 5 kV as shown in FIG. 2d. Subsequently, the thus poled fiber is returned to room temperature, at which a linearly polarized beam is inputted from the left-hand end face of the optical fiber as viewed in FIG. 2d to observe a state of polarization of an output beam. For the observation, the beam is inputted such that the plane of polarization of the linearly polarized input beam is set at an angle of 45° as viewed from the x axis toward the y axis. If an ellipticity of the output beam is larger than an intended value, the poling is further continued. After returning the further poled fiber to room temperature, the state of a polarized beam is observed in the same manner as described above, and the poling is completed when the transmitted beam consists of a linearly polarized beam. In this state of FIG. 2d, a $\lambda/4$ plate is inserted in the light path at the beam-inputting side. It has been found that when a potential of 1000 V is applied to the electrooptic element made of a portion 24' poled from both x and y axes, a degree of modulation is 1.5%.

The thus poled optical fiber is assembled in an optical modulator M shown in FIG. 3 in the same manner as illustrated with reference to FIG. 1. In FIG. 3, like reference numerals as in FIG. 1 indicate like parts or members, respectively, provided that reference numeral 18' in FIG. 3 indicates polarizer+$\lambda/4$ plate, and reference numeral 14' indicates an electrooptic element made of the portion of an optical fiber poled from two different directions and illustrated above.

When the modulator M is applied with an AC voltage of 1000 V, signals with a degree of modulation of 1.4% are obtained. The distortion rate is as low as within 0.8%. Moreover, a variation in degree of modulation of the modulator in the temperature range of −20 to +80° C. is very good at ±1.5% relative to a degree of modulation at room temperature taken at 100%. Moreover, when the modulator M is placed at high temperatures of 70° C. or above, no DC drift is observed, unlike an optical modulator comprising a crystal plate of $Bi_4Ge_3O_{12}$, thereby ensuring a stable temperature characteristic.

When the absolute value, $\delta 1$, of the phase difference of a beam transmitted through a wave plate having the same optical phase difference as the wave plate used in the wave plate+polarizer 18 and the electrooptic element is a multiple of an odd number of $\pi/2$, good linearity is obtained. Further, when a deviation from the multiple of an odd number of $\pi/2$ is within $\pm\pi/6$, modulated signals can be obtained, and such a modulator is usable as an optical fiber modulator or sensor. The temperature characteristic is best when the absolute value, $\delta 1$, is $\pi/2$.

The wave plate+electrooptic element 18 may be reversed in order provided that the principal dielectric axis of the wave plate and that of the electrooptic element are coincident with each other. For instance, the wave plate may be attached to the analyzer. This is true of other embodiments which comprises both wave plate and electrooptic element.

Reference is now made to FIGS. 4a to 4e and FIGS. 5a to 5d illustrating an application of an optical fiber modulator as an optical fiber sensor according to another embodiment of the invention.

Figure 4A:
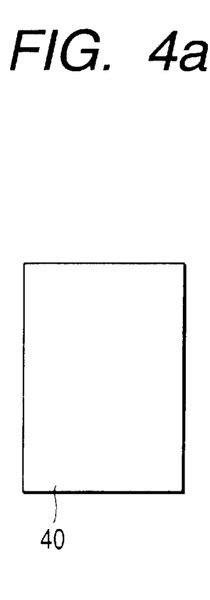
FIGS. 4a to 4e are, respectively, schematic views illustrating a method for making an optical fiber modulator, suited as an electric field or voltage sensor, according to a further embodiment of the invention.
Figure 4B:
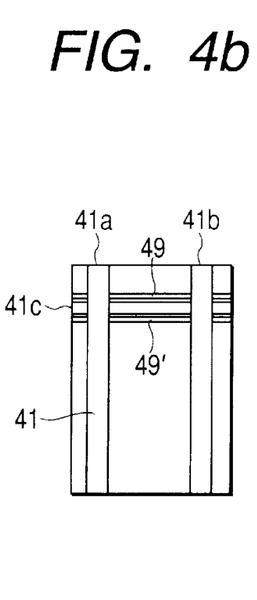
Figure 4C:
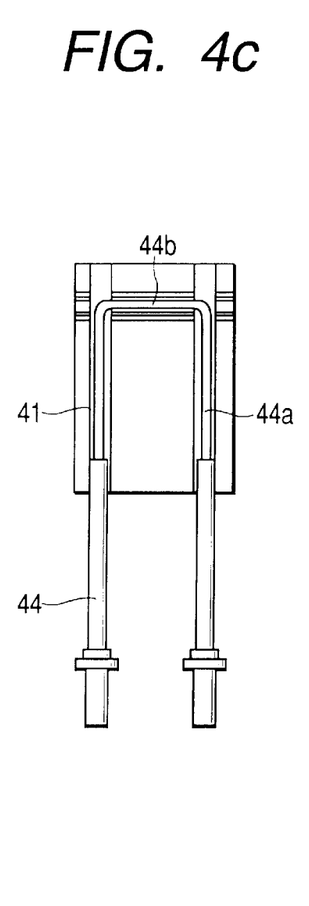
Figure 4D:
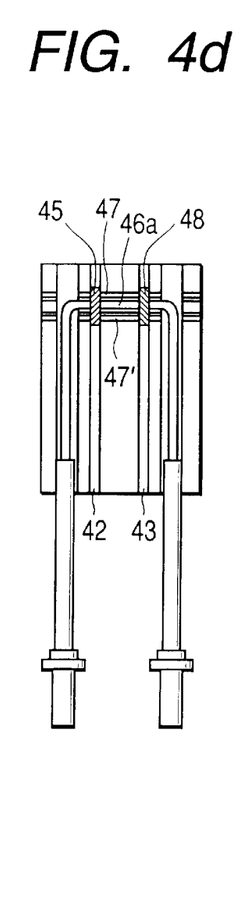
Figure 4E:
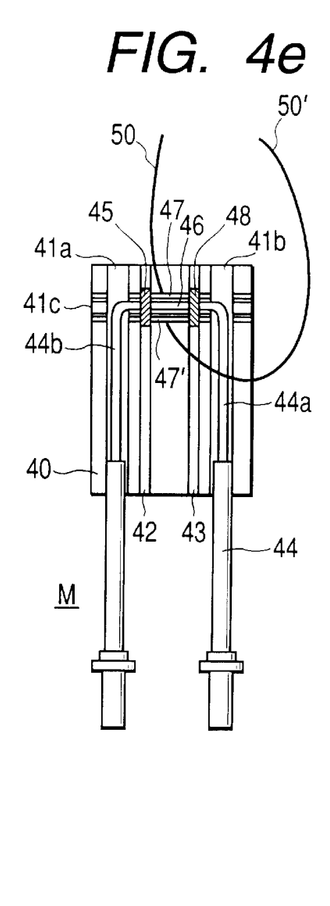

An optical fiber modulator M shown in FIG. 4e includes a substrate 40, which has a groove pattern 41 constituted of three grooves 41a, 41b, 41c, and grooves 42, 43 formed substantially normal to the groove 41c, and a U-shaped optical fiber 44 having a bare portion 44a and flat bottom 44b. A polarizer 45, an electrooptic element 46 having a pair of electrodes 47, 47'z at opposite sides of the element 46, and an analyzer 48 sequentially aligned in this order so that optical axes of these elements are in a light path of the optical fiber 44. The electrooptic element 46 is made of a portion of the optical fiber 44, which is poled in one direction vertical to a light path where. a beam propagates in the optical fiber 44. The electrodes 47 and 47' are connected to leads 50 and 50', respectively, which are connected to a power supply (not shown). The optical fiber modulator M having individual elements integrated in a hybrid manner is arranged as shown in FIG. 4e.

For the fabrication of the modulator M the substrate 40 is first provided as shown in FIG. 4a. The substrate 40 is made of a heat-resistant material such as BK7 glass in view of the fact that the substrate 40 is heated when the optical fiber 44 is poled at part thereof Thereafter, the grooves 41a, 41b and 41c are made by use of a rotary blade saw to form a groove pattern 41 as shown in FIG. 4b. At the same time, grooves 49, 49' are formed in which the electrodes 47, 47' are inserted to sandwich a portion 46a to be poled.

Separately, the optical fiber 44, which has a U form having the flat bottom 44b, is made in a manner described hereinafter. The optical fiber 44 has the bare portion 44a from which a jacket is removed.

The optical fiber 44 is set in the groove pattern 41 and bonded to the substrate 40 as shown in FIG. 4c. The bonding agents used for this purpose may be ceramic bonding agents comprising alumina and/or silica powder.

The fabrication of the shaped optical fiber 44 is described with reference to FIGS. 5a to 5d.

Figure 5A:
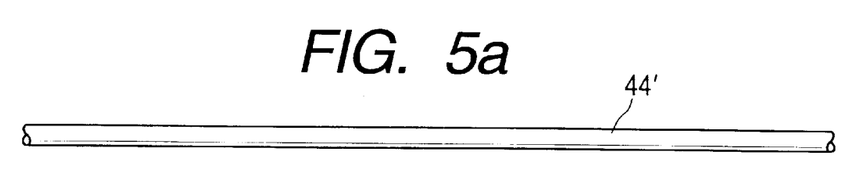
FIGS. 5a to 5d are, respectively, schematic views illustrating a procedure of making an optical fiber shaped in U form.
Figure 5B:
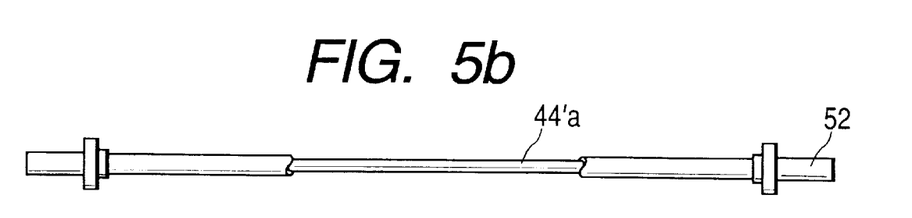
Figures 5C, 5D:
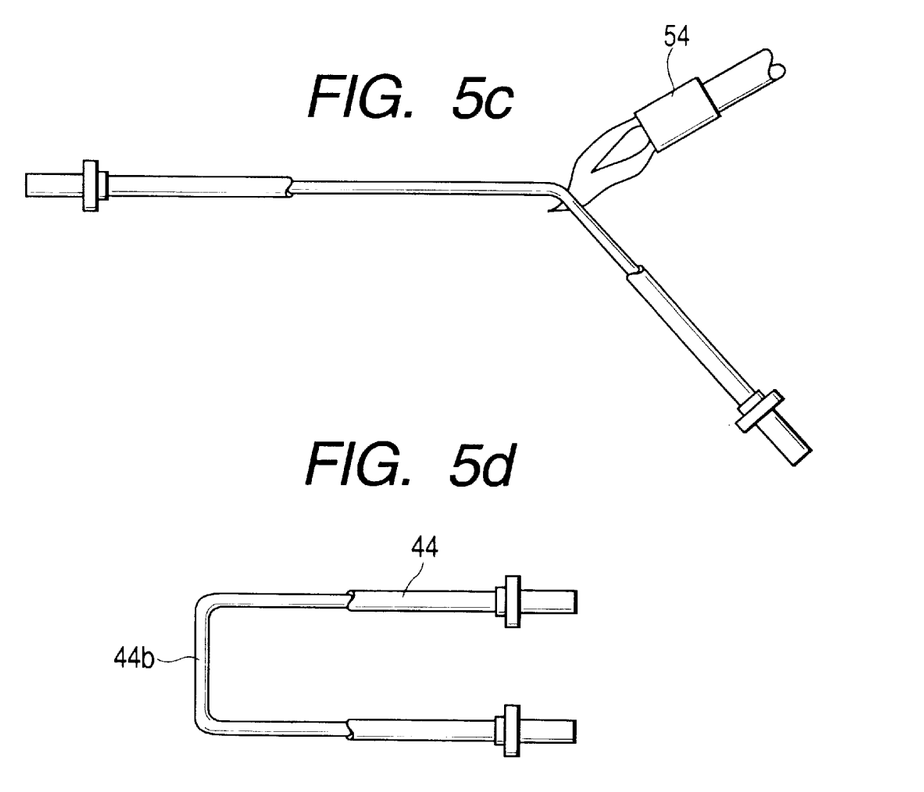

A straight optical fiber 44' is first provided as shown in FIG. 5a, and a jacket is removed from part of the fiber 44' to provide a bare fiber 44'a as shown in FIG. 5b. The optical fiber 44' is provided with a ferrule 52 at opposite ends thereof. The bare optical fiber 44a has, for example, a silica core with a diameter of 200 μm and a cladding layer covering the core therewith and having a diameter of 250 μm. The core is doped with $GeO_2$ in order to enhance a refractive index. This type of fiber has a softening temperature of 900 to 1000° C. Accordingly, the bare fiber 44a can be shaped, as desired, by use of a micro gas burner 54 in a manner as shown in FIG. 5c to provide a U-shaped fiber 44 having a flat bottom 44b as shown in FIG. 5d. This U-shaped fiber 44 is used in FIG. 4c.

Reference is now made to FIGS. 44d and 4e. In FIG. 4d, grooves 42, 43 are made by means of a rotary blade saw, at which part of the optical fiber 44 in the groove pattern 41 is removed. The polarizer 45 and the analyzer 48 are set in the grooves 42, 43, respectively, and bonded to the substrate 40.

Subsequently, a pair of electrodes 47, 47' made of a stainless steel thin sheet are, respectively, inserted into the grooves 49, 49' as shown in FIG. 5e. The space between the electrodes 47, 47' is, for example, 1 mm. Lead wires 50, 50' are electrically connected to the electrodes 47, 47', respectively, at one end thereof, and are connected to a power supply for poling treatment or for measurement of a degree of modulation at the other end of each wire.

If an optical fiber from a light source (not shown) is connected to at one end of the optical fiber 44 and another optical fiber from a light-receiving device (not shown) is connected to the other end of the optical fiber 44, a system of measuring a modulation signal of the optical fiber modulator M can be arranged.

A heater (not shown) is intimately contacted with at an upper portion of the substrate 40 as viewed in FIG. 4e. The substrate is heated to 200° C. in an atmosphere of dry nitrogen, and the portion 46 of the optical fiber 44 attached with the electrodes 47, 47' is poled by application of a potential of 10 kV for 30 minutes, for example. For the application, the lead wires 50, 50' are connected to a power supply (not shown) for poling.

Next, the poling is stopped, and the connection of the lead wires 50, 50' is changed to a power supply for the measurement of a degree of modulation. An AC voltage of 1000 V is applied across the electrodes to measure a distortion rate of a modulation signal. If the distortion rate is larger than intended, the poling is further continued in a manner as described above until the distortion rate is 1% or below when an AC voltage of 1000 V is applied to. The resultant modulator is cooled down to room temperature to complete the poling treatment. When applied with an AC voltage of 1000 V, the optical fiber modulator obtained in this manner has a degree of modulation of 1.0% and a distortion rate of 0.8% relative to an AC waveform of SIN wave. In this modulator, the portion of the optical fiber is poled only in one direction and serves as both electrooptic element and wave plate. Accordingly, modulation signals with good linearity can be obtained without use of any wave plate.

This type of optical fiber modulator has the directions of beam input and output, which are parallel to each other. Thus, the size of the modulator can be made smaller than those modulators of FIGS. 1 and 3, and thus, the modulator is especially suitable as a sensor.

A still further embodiment is illustrated with reference to FIGS. 5c to 5d and FIGS. 6a to 6d. In FIGS. 6a to 6d, like reference numerals as in FIGS. 4a to 4d indicate like parts or members, respectively.

An optical fiber modulator M of this embodiment is similar to the modulator illustrated with reference of FIGS. 4a to 4d except that a portion of an optical fiber is poled from two different directions along the x and y axes as illustrated in FIGS. 2c and 2d or in FIG. 7a and that a wave plate is used. The portion of the optical fiber is so poled in this embodiment that the phase difference of a beam transmitted through a λ/4 plate and the electrooptic element is just π/2, for example.

The optical fiber is poled at a portion thereof in a manner as illustrated in FIGS. 2a to 2d.

The thus poled fiber is shaped according to the procedure shown in FIGS. 5c and 5d. More particularly, the optical fiber heated by means of the micro gas burner 54 to form a U-shaped optical fiber having a flat bottom 44b. In order not to apply heat to the poled portion, two corners of the U shape are processed within a short time, for example, of 10 to 30 seconds while closing down a burner tip to use a fine flame.

Figure 6A:
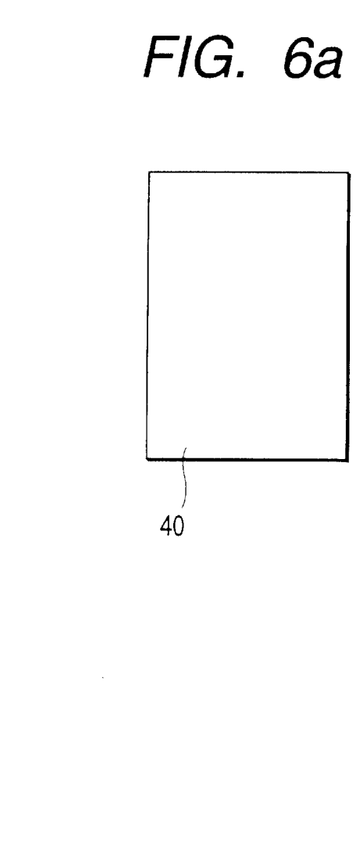
FIGS. 6a to 6d are, respectively, schematic views illustrating a procedure of making an optical fiber modulator, suited as an electric field or voltage sensor, according to another embodiment of the invention.
Figure 6B:
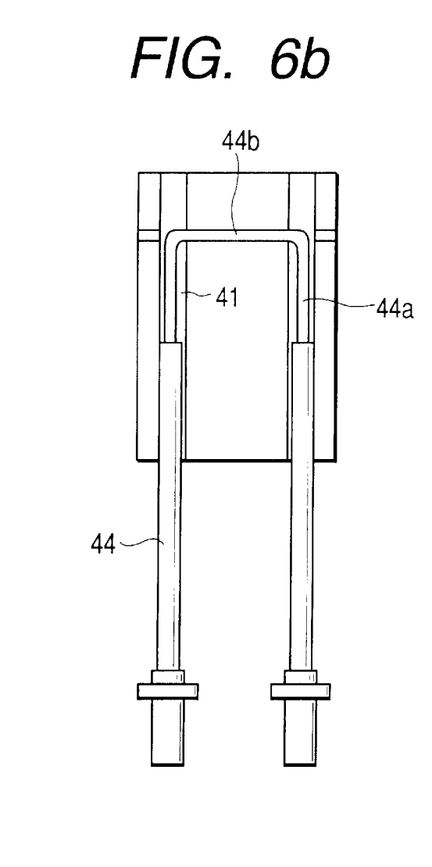
Figure 6C:
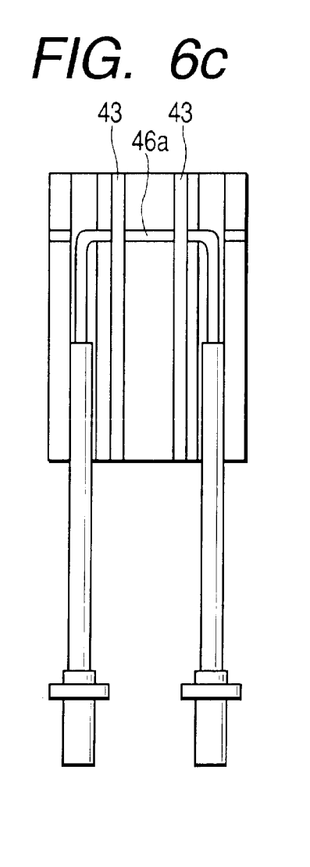
Figure 6D:
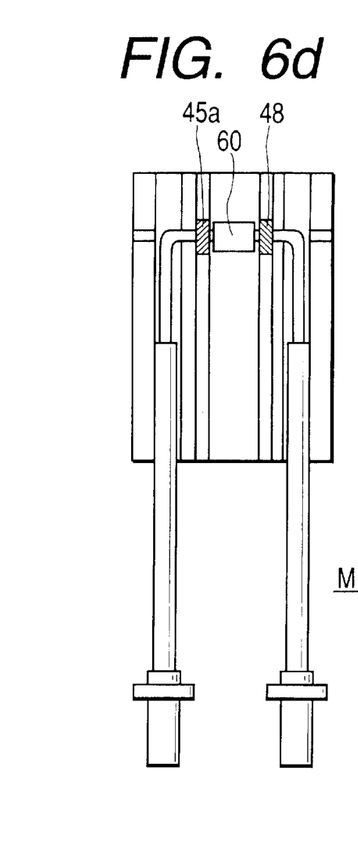

In FIG. 6a, there is shown a substrate 40. In this case, the substrate is not heated and may be made of a glass-epoxy resin. A groove pattern 41 is made as in the foregoing embodiment. The U-shaped optical fiber 44 is set in the groove pattern 41 and bonded to the substrate 40 as shown in FIG. 6b. Grooves 42, 43 are formed for inserting optical elements therein. That is, a polarizer element 45a made of a polarizer and a λ/4 plate made of quartz and integrally combined with the polarizer is fixed in the groove 42, and an analyzer 48 is fixed in the groove 43 as shown in FIG. 6d.

A poled portion 46a of the optical fiber 41 is bonded with an electrode 60 on an upper side thereof. Another electrode (not shown) is bonded to a rear side of the substrate 40 at a portion processed to a thickness of about 0.2 mm, thereby obtain an optical fiber modulator shown in FIG. 6d. In FIG. 6d, lead wires connected to the electrodes are not shown for convenience' sake.

It has been found that when an AC voltage of 1000 V is applied to the modulator, a degree of modulation is 1.4%. The distortion rate relative to the voltage of SIN wave is 0.5% or below. When the sensor is further subjected to measurement of a temperature characteristic within a range of −20 to +80° C., the variation is within ±2% relative to a degree of modulation at room temperature taken at 100%. This is because the difference in refractive index at the poled portion of the optical fiber is substantially zero and the electrooptic element is in birefringence-free condition, so that any deviation of an optical bias as is caused by the temperature characteristic of birefringence does not occur. Moreover, when the sensor is placed at high temperatures of 70° C. or above, any DC drift is not observed, unlike an optical modulator comprising a crystal plate of $Bi_4Ge_3O_{12}$, thereby ensuring a stable temperature characteristic.

It will be noted that any measure of suppressing an optical loss at the bent portions of the shaped optical fibers with reference to FIGS. 4a to 4e and FIGS. 6a to 6d is not made.

If it is desirable to minimize an optical loss, a beam reflection dielectric multi-layered film or metallic paste coating may be formed on the bent portions.

What is claimed is:

1. An optical fiber modulator which comprises an optical fiber, a substrate having a groove pattern in which the optical fiber is fixed, and a modulation unit including a polarizer, an electrooptic element, and an analyzer aligned in a light path of the optical fiber in this order, wherein the electrooptic element is made of a poled portion of the optical fiber, and when the electrooptic element is in an electric field-free condition, an absolute value, δ, of a phase difference of a beam passed through said electrooptic element is within the following range $$(m/2-1/6)\pi \leq \delta \leq (m/2+1/6)\pi$$

wherein m is an odd number.

2. An optical fiber modulator according to claim 1, wherein absolute value, δ, is such that $\pi/3 \leq \delta \leq 2\pi/3$.

3. An optical fiber modulator according to claim 1, wherein said optical fiber is straight.

4. An optical fiber modulator according to claim 1, wherein said optical fiber has a U form having a flat bottom in which said modulation unit is set.

5. An optical fiber modulator according to claim 1, wherein the poled portion is obtained by poling from one direction normal to the light path.

6. An optical fiber modulator which comprises an optical fiber, a substrate having a groove pattern in which the optical fiber is fixed, and a modulation unit including a polarizer, an electrooptic element, and an analyzer aligned in a light path of the optical fiber in this order provided that an wave plate is provided between the polarizer and the electrooptic element or between the electrooptic element and the analyzer, wherein said electrooptic element is made of a poled portion of the optical fiber, and when the electrooptic element is in an electric field-free condition, an absolute value, δ1, of a phase difference of a beam passed through said wave plate and said electrooptic element is within the following range $$(n/2-1/6)\pi \leq \delta 1 \leq (n/2+1/6)\pi$$

wherein n is an odd number.

7. An optical modulator according to claim 6, wherein the absolute value, δ1, is such that $\pi/3 \leq \delta 1 \leq 2\pi/3$.

8. An optical modulator according to claim 6, wherein the poled portion is one poled from two different directions.

9. An optical modulator according to claim 8, wherein the two different directions are substantially vertical to each other within a range of 90°±10°.

10. An optical fiber modulator according to claim 6, wherein said optical fiber is straight.

11. An optical fiber modulator according to claim 6, wherein said optical fiber has a U form having a flat bottom in which said modulation unit is set.

12. A method of making an optical fiber modulator which comprises an optical fiber, a substrate having a groove pattern in which said optical fiber is fixed, and a modulation unit including a polarizer, an electrooptic element, and an analyzer aligned in a light path of the optical fiber in this order, comprising the steps of:

forming said electrooptic element of a portion of said optical fiber, poling said optical fiber while observing a state of the polarized beam passing through the poled portion so that when the poled portion is in an electrical field-free condition, an absolute value, δ, of a phase difference of a beam passing through the poled portion is within a range $$(m/2-1/6)\pi \leq \delta \leq (m/2+1/6)\pi$$

wherein m in an odd number.

13. A method according to claim 12, wherein absolute value, δ, is such that $\pi/3 \leq \delta \leq 2/3\pi$.

14. A method according to claim 12, wherein the poling is effected such that when an AC electric field is applied to said electrooptic element assembled in said modulator, a distortion rate of a modulation signal of the beam immediately after transmission through said electrooptic element is a minimum.

15. A method according to claim 12, wherein said optical fiber is straight.

16. A method according to claim 12, wherein said optical fiber is shaped in U form having a flat bottom, at which said modulation unit is set.

17. A method according to claim 12, wherein said step of poling is such that said portion is poled from a direction substantially normal to the light path and in a range of 90±10 degrees.

18. A method for making an optical fiber modulator which comprises an optical fiber, a substrate having a groove pattern in which the optical fiber is fixed, and a modulation unit including a polarizer, and electrooptic element, and an analyzer aligned in a light path of the optical fiber, comprising the steps of:

disposing a wave plate between the polarizer and the electrooptic element or between the electrooptic element and the analyzer;

forming the electrooptic element from a portion of the optical fiber by subjecting the portion to poling by successively applying an electrical field or voltage from two different directions substantially normal to the light path and within a range of 90±10 degrees thereto while observing a state of polarization of a beam passing through a second wave plate having the same optical phase difference as the first mentioned wave plate and the poled portion for each application of the electrical field or voltage, so that when the poled portion is in an electric field-free condition, and absolute value, δ1, of a phase difference of a beam passing through the poled portion is within a range $$(n/2-1/6)\pi \leq \delta 1 \leq (n/2+1/6)\pi$$

wherein n is an odd number.

19. A method according to claim 18, wherein the absolute value, ε1, is such that $\pi/3 \leq \delta 1 \leq 2\pi/3$.

20. A method according to claim 18, wherein the poling is effected such that when an AC electric field is applied to electrooptic element, a distortion rate of a modulation signal of the beam immediately after transmission through the analyzer is minimized.

21. A method according to claim 18, wherein said optical fiber is straight.

22. A method according to claim 18, wherein said optical fiber is shaped in U form having a flat bottom, at which said modulation unit is set.

* * * * *